(12) United States Patent
Daoud

(10) Patent No.: US 6,259,851 B1
(45) Date of Patent: Jul. 10, 2001

(54) HIGH DENSITY FIBER SPLICE HOLDER

(75) Inventor: Bassel H. Daoud, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/397,888

(22) Filed: Sep. 17, 1999

(51) Int. Cl.[7] ..................................... G02B 6/00
(52) U.S. Cl. ..................... 385/135; 385/137; 174/74 R
(58) Field of Search ................................ 385/134, 135, 385/136, 137, 99; 174/77 R, 93, 74 R; 439/719, 942

(56) References Cited

U.S. PATENT DOCUMENTS 5,515,472 * 5/1996 Mullaney et al. .................. 385/135
5,530,786 * 6/1996 Radliff et al. ..................... 385/136
5,566,269 * 10/1996 Eberle, Jr. et al. ................. 385/137

* cited by examiner

Primary Examiner—Cassandra Spyrou
Assistant Examiner—Euncha Cherry
(74) Attorney, Agent, or Firm—Hedman & Costigan, PC

(57) ABSTRACT

A splice holder for optical fiber splices capable of holding multiple single fiber splices, ribbon fiber splices and combinations thereof comprising a base, at least two opposed rows of a plurality of retention members having openings for accepting single splices and lateral members extending in the area between said opposed retention members for accepting ribbon splices. The splice holder is preferably formed of unitary construction from a flexible material. The splice holder can be attached to a splice tray by adhesive, double sided tape or by the use of tabs on the splice holder which can slide under engagement means on the splice tray.

15 Claims, 7 Drawing Sheets

HIGH DENSITY FIBER SPLICE HOLDER

FIELD OF THE INVENTION

The present invention relates to peripherals for optical fibers and, more specifically, to structures for holding a plurality of optical fiber splices.

BACKGROUND OF THE INVENTION

Due to the nature of optical fibers, joining two ends requires splices which are of significantly greater size than the fiber itself. The splices create physical conditions which can lead to damage of the fiber optic cable entering and leaving the splice. As such, devices have been designed for holding splices, thereby limiting the movement of the splice and potential damage to the fiber.

Many of the splice holders presently used are high density holders, capable of holding multiple splices. Generally, these comprise a number of adjacent vertical ribs extending upwardly from a base with spaces therebetween for the splices to be inserted. The space between the vertical extensions is determined by the thickness of the splice so that a friction fit is achieved when the splice is inserted into the splice holder.

An additional consideration in retaining splices is the type of fiber spliced. Generally, optical fiber is available in single fiber format and a ribbon of 12 fibers connected together. The standard splice for a fiber ribbon is about 1.6" long and about 0.2" wide, shorter and wider than the standard single fiber splice which is about 2.35" long and about 0.12" in diameter. As such, splice holders are typically made in two different dimensions depending on whether they hold single fiber splices or ribbon splices, the distance between the vertical ribs being farther apart to fit the thicker but shorter ribbon splices.

SUMMARY OF THE INVENTION

The present invention is directed to a multiple splice holder comprising a base member, at least two opposed rows of a plurality of adjacent retention members extending upwardly from said base member, said retention members each having at least one lateral opening therein for accepting at least a portion of a single fiber splice, and a plurality of lateral members in an area between the rows of opposed retention members for accepting at least a portion of a fiber ribbon splice, wherein adjacent retention members are separated by a space for a fiber ribbon to pass through when a fiber ribbon splice is engaged by the lateral members.

Preferably, the lateral members extend from the retention members in the direction of the corresponding opposed retention members. Most preferably, the lateral members extend inwardly from each of the opposed retention members.

Also preferred are lateral openings on the retention members which are defined by walls extending greater than 180° about the opening. This configuration provides a contoured fit for retaining the single fiber splices.

The base is preferably attached to a splice tray or other known element by known means such as adhesive or double sided tape or tabs which are accepted by engagement means on a splice tray.

BRIEF DESCRIPTION OF THE DRAWINGS

The following drawings, in which like reference characters designate like parts, are intended merely to illustrate the present invention without limiting the invention in any manner whatsoever, wherein.

DETAILED DESCRIPTION OF THE PREFERRED EMBODIMENT

Figure 1:
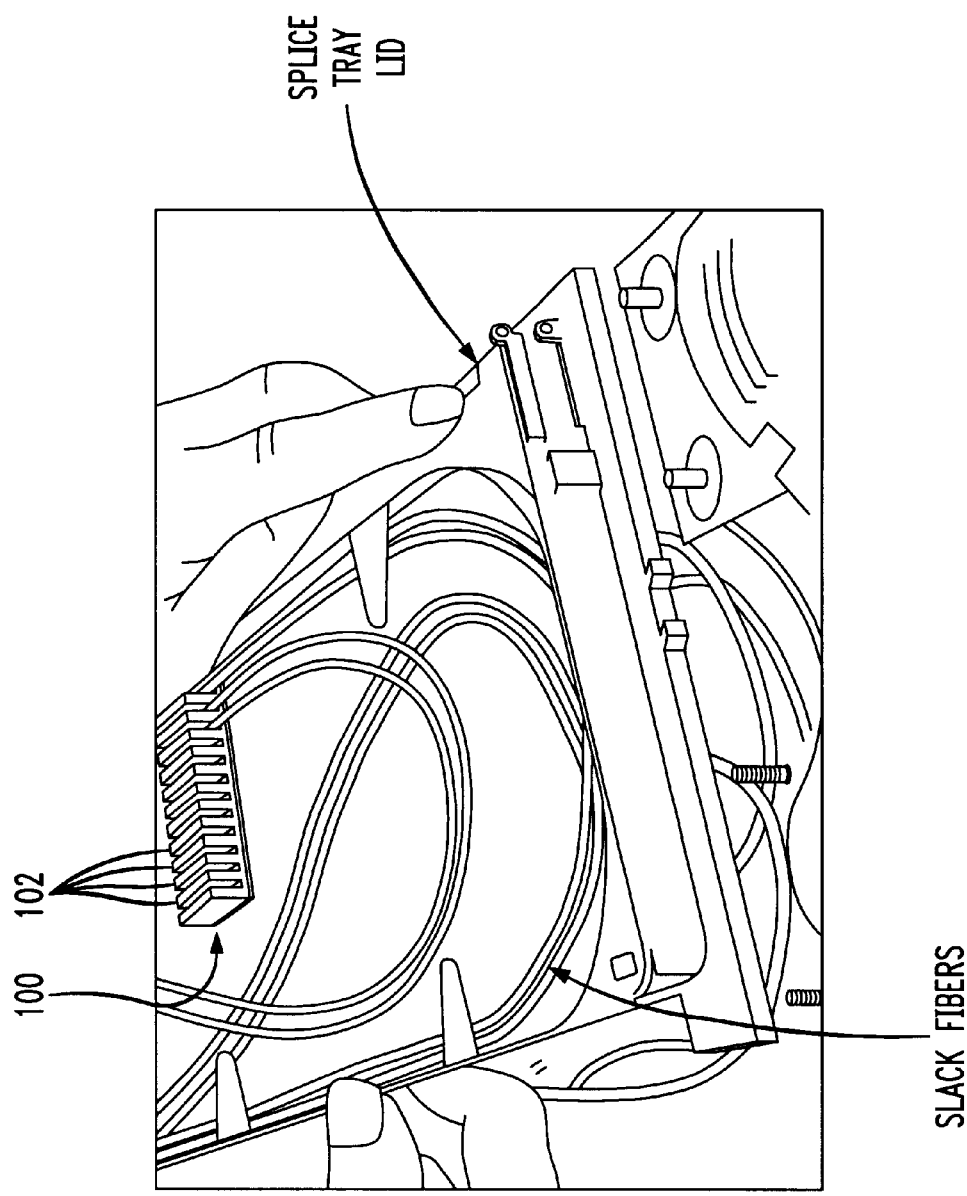
FIG. 1 is a perspective view of the splice holder of the prior art mounted on a splice tray.
Figure 2:
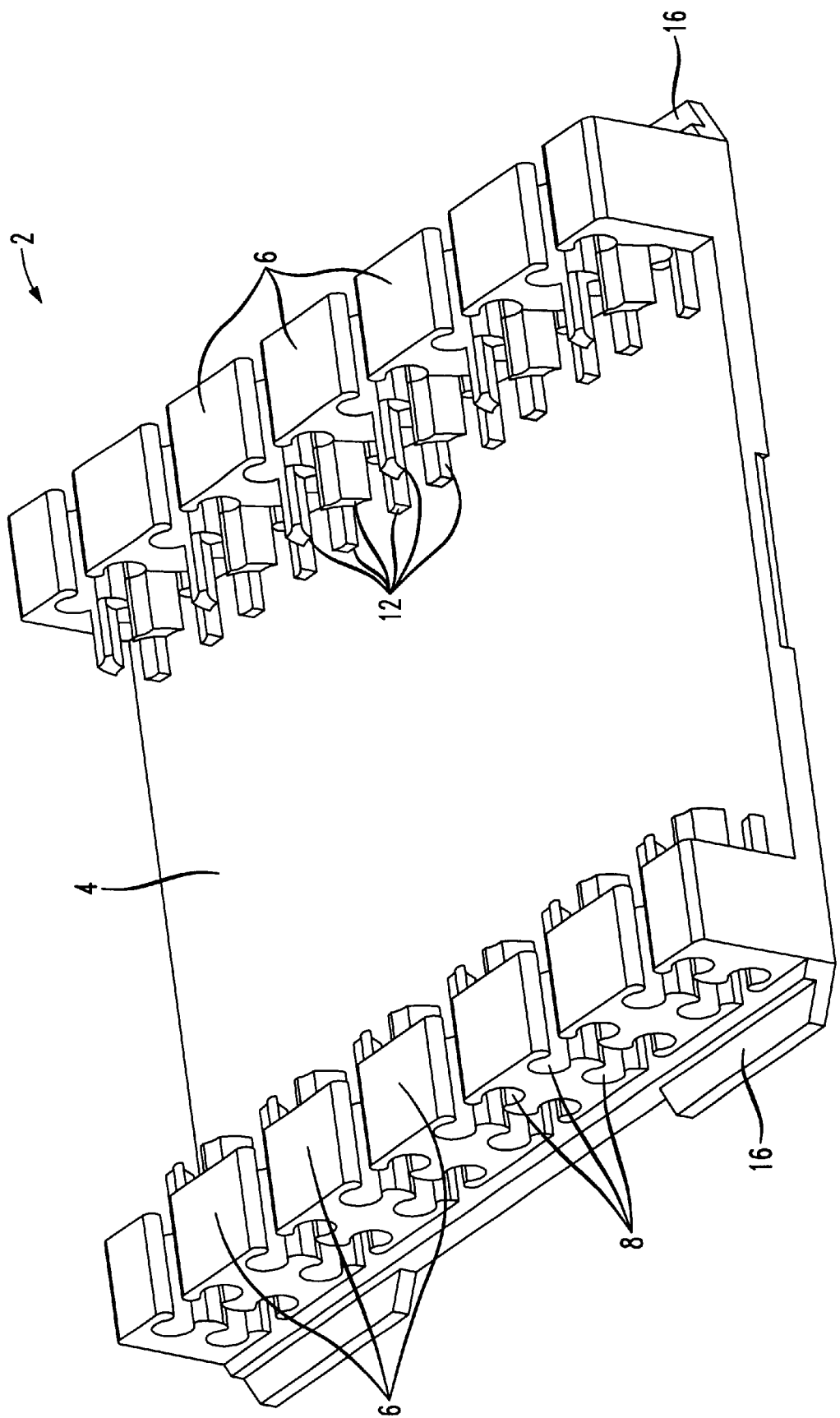
FIG. 2 is a perspective view of the preferred splice holder of the present invention.
Figure 3:
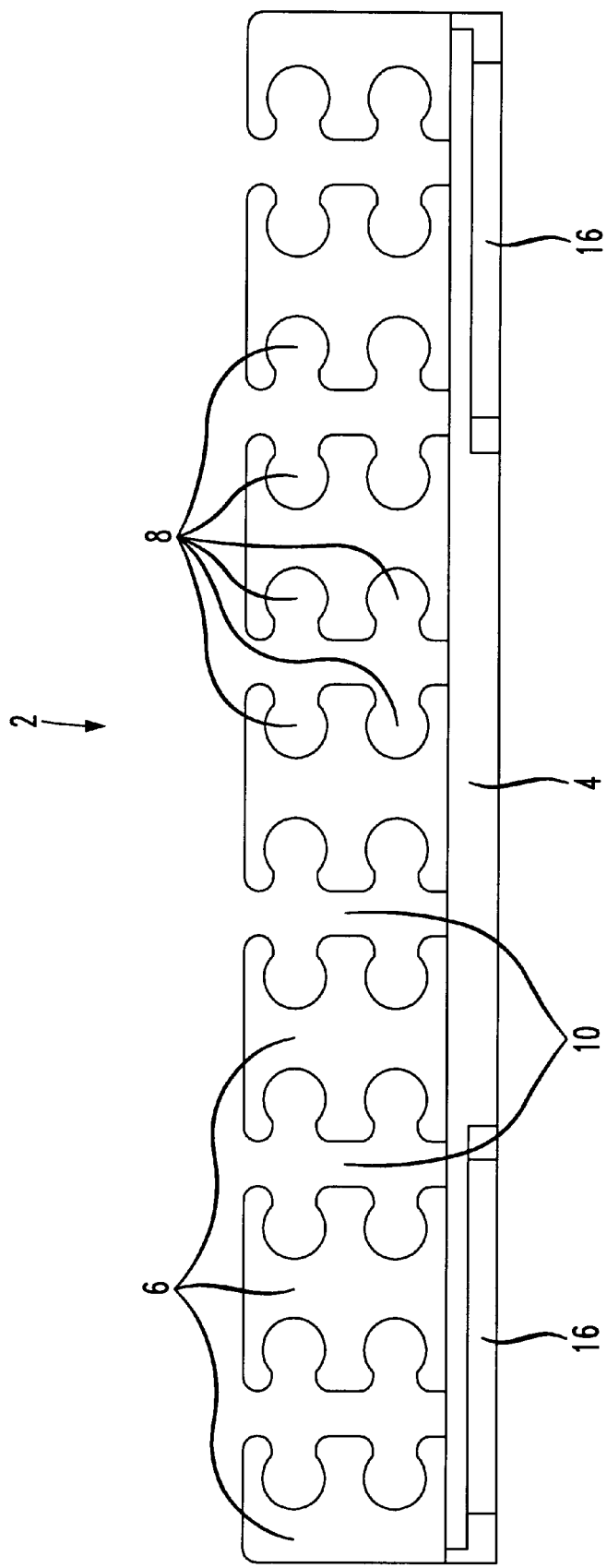
FIG. 3 is a side elevation of the preferred splice holder of the present invention.

As shown in FIG. 1, the high density splice holder 100 of the prior art consists of a plurality of ribs 102 aligned with spaces therebetween for a friction fit of the multiple splices in serial fashion. As set forth above, the prior art merely provided a distinct splice holder having a greater distance between the ribs when use with ribbon splices are contemplated.

The splice holder 2 of the present invention, shown in FIGS. 2–5, comprises a base member 4 and opposed retention members 6 projecting upwardly from said base 4. The retention members 6 include lateral openings 8 for holding at least a portion of single fiber splices and are separated from adjacent retention members 6 by spaces 10 through which a fiber ribbon can pass.

The lateral openings 8 in the retention members 6 are preferably defined by walls which extend greater than 180° about the perimeter of the lateral openings 8 to securely capture the single fiber splice. The diameter of the opening 8 is substantially the same as the diameter of a single fiber splice, the current standard for which is about 0.12". Most preferably, the lateral openings 8 are placed in vertical arrangement on the retention members 6 and are accessed from the spaces 10 between adjacent retention members 6.

The opposed rows of retention members 6 are preferably placed on the base 4 an opposed distance F of less than about 2.35", with about 2.2" being most preferred, measured at the farthest points. The most preferred distance generally corresponds to slightly less than the length of a single fiber splice, as currently known in the art, so that the ends of the splice extend beyond the retention members 6 for user manipulation when removing the splice from the retention members 6.

The present invention also includes lateral members 12 which extend within the area between the opposed rows of retention members 6. Most preferably, the lateral members 12 extend directly from said retention members 6. The lateral members 12 are preferably contoured so that they do not interfere with the lateral openings 8 in the retention members 6.

Figure 4:
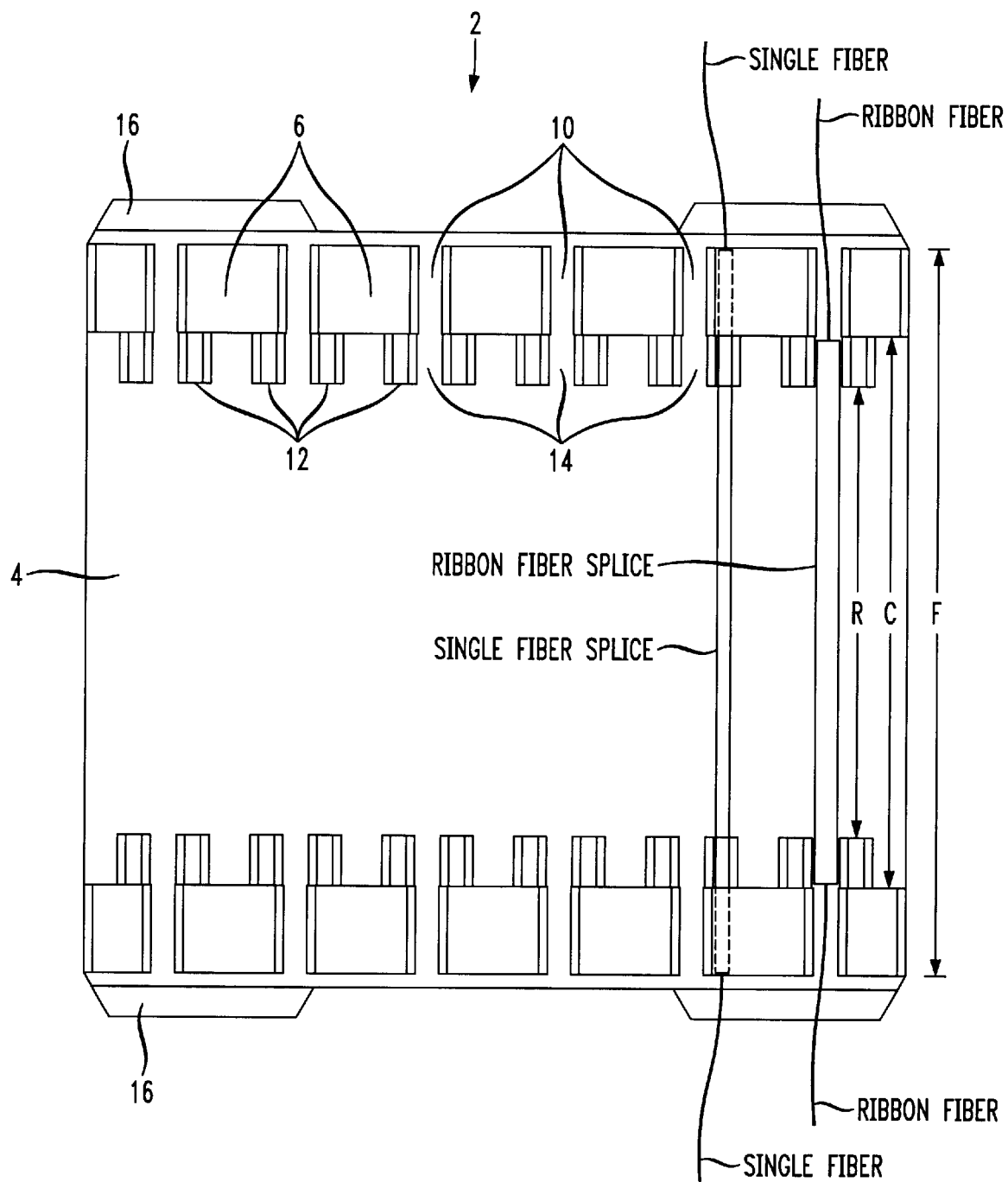
FIG. 4 is a plan view of the preferred splice holder of the present invention.
Figure 5:
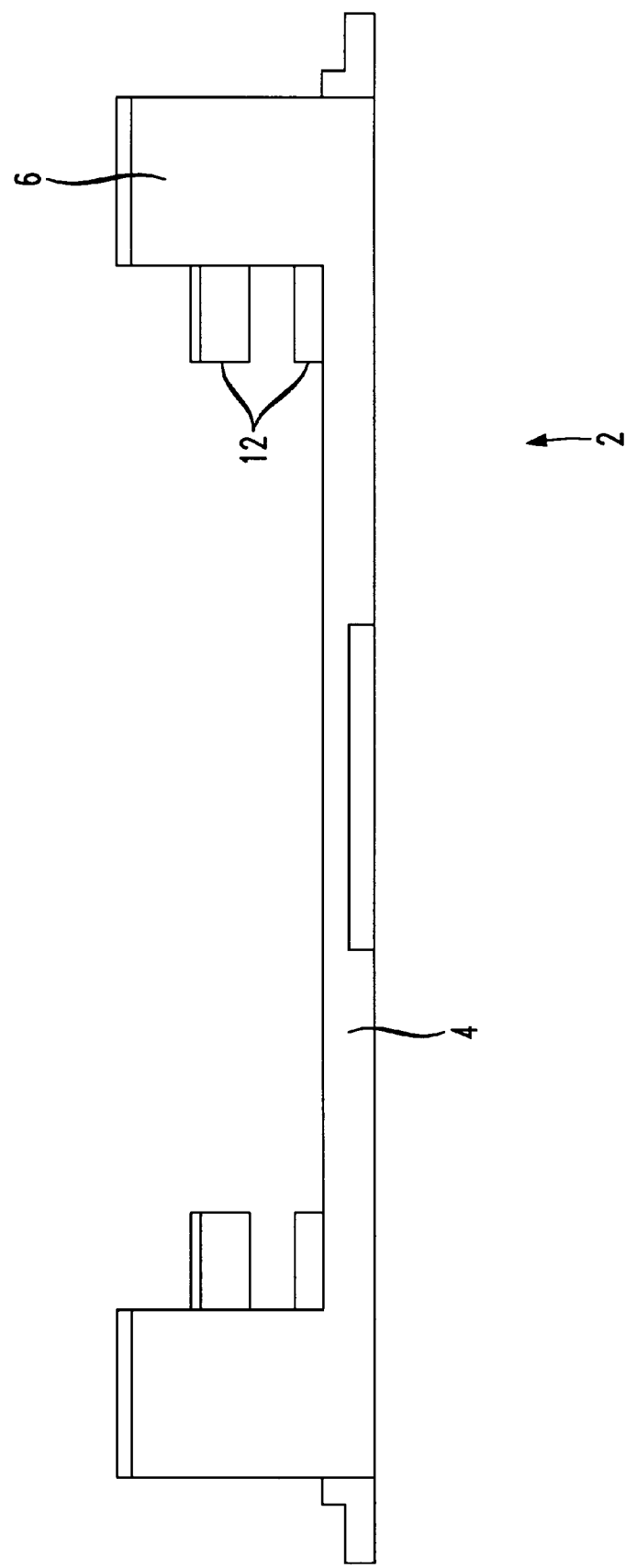
FIG. 5 is a front elevation of the preferred splice holder of the present invention.

The gap 14 between adjacent lateral members 12 is designed for a friction fit of a ribbon splice with the fiber ribbon exiting through the space 10 between adjacent retention members 6 (see FIG. 4). Based on the current dimensions of a known ribbon splice, the gap 14 between adjacent lateral members 12 is about 0.2" to form a friction fit with the ribbon splice.

The lateral members 12 preferably extend from said retention members 6 a distance sufficient so that the lateral members securely engage at least a portion of the ribbon splice. As such, the distance R between the closest ends of opposed lateral members 12 is less than 1.6", the length of a standard ribbon splice, to provide for contact with at least the ends of the ribbon splice. In its most preferred embodiment, the distance R between the closest portions of opposed lateral members 12 is about 1.4", with the closest distance C between opposed retention members 6 being about 1.6".

Figure 6:
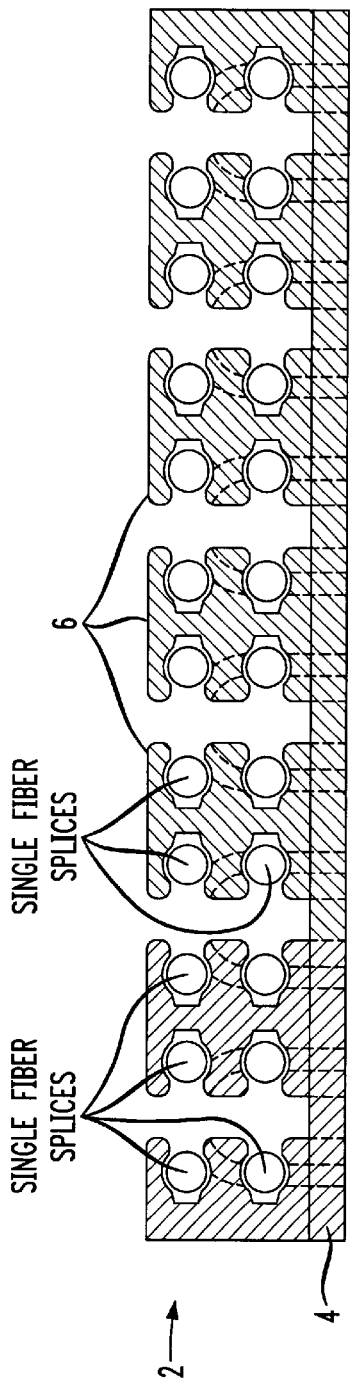
FIG. 6 is a side elevation of the preferred splice holder of the present invention shown with single fiber splices being held exclusively thereon.
Figure 6A:
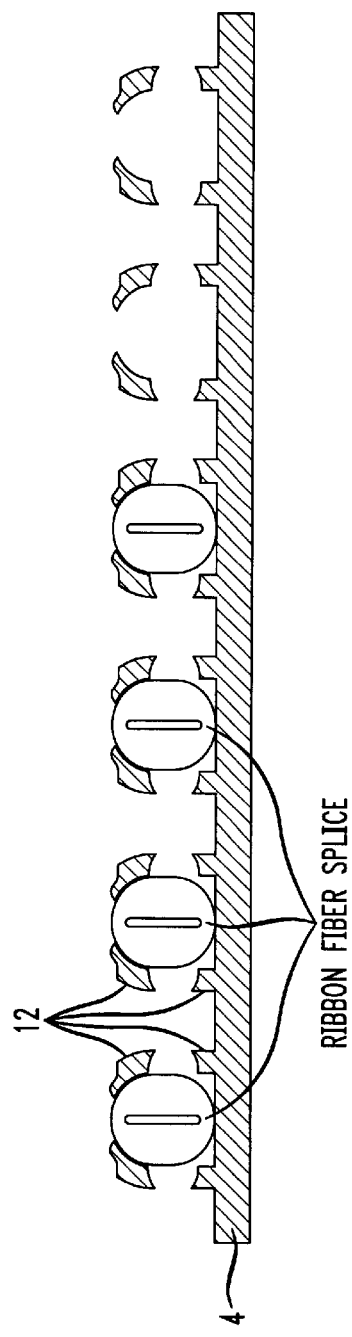
FIG. 6A is a cross-sectional elevation of the preferred splice holder of the present invention shown with ribbon fiber splices being held thereon.
Figure 6B:
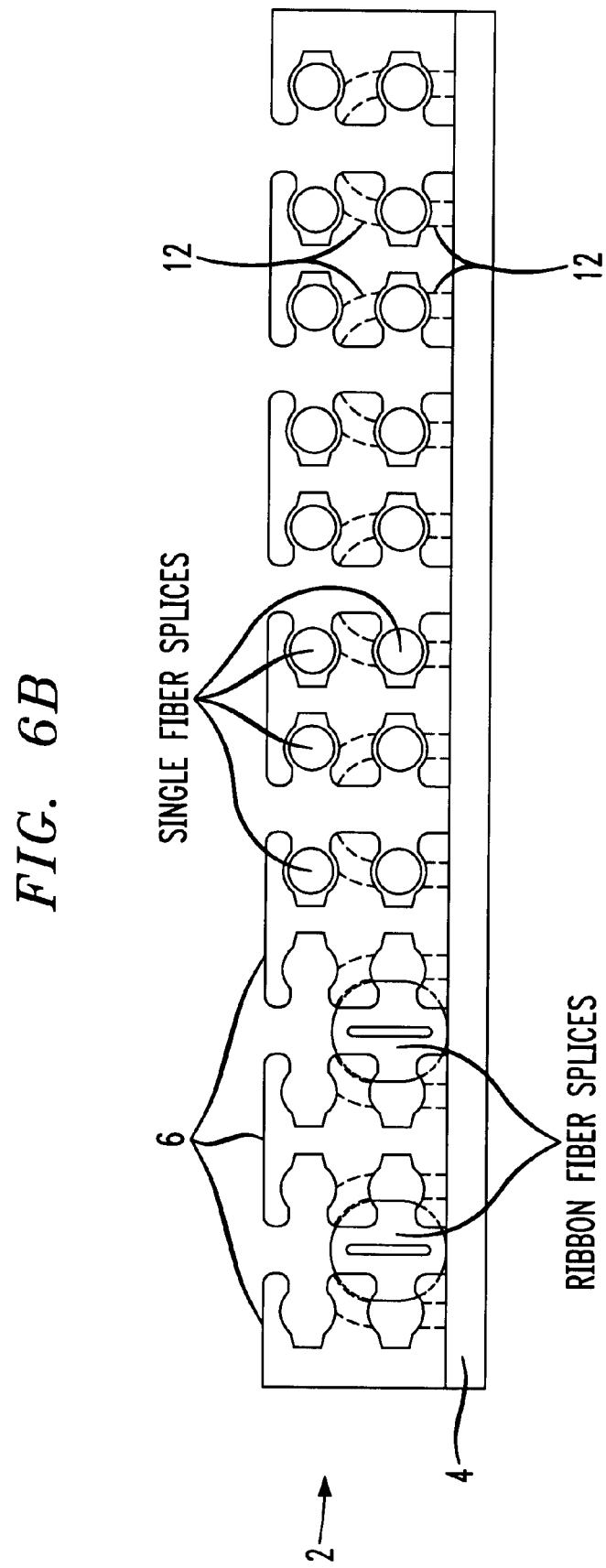
FIG. 6B is a side elevation of the preferred splice holder of the present invention shown with single and ribbon splices being held thereon.

The structure of the present invention allows use of the same splice holder 2 to be used to hold single fiber splices exclusively (see FIG. 6), ribbon fiber splices exclusively (see FIG. 6A) or any combination of single fiber splices and ribbon fiber splices (as shown in FIG. 6B).

The splice holder 2 of the present invention is preferably a unitary structure, molded from a flexible material such as rubber or polyvinyl chloride (PVC), PVC being most preferred. The base 4 is preferably attached to a splice tray or similar device using methods generally known in the art. These methods include the use of adhesives, double sided tape on the bottom of the base 4 or other means. Alternatively, tabs 16 are included on the base 4 for sliding under engagement means such as channels on a splice tray (not shown) to hold the splice holder 2 onto a splice tray. However, the method of attachment of the splice holder 2 to a splice tray is not considered an essential aspect of the invention.

Variations, alterations and modifications to the invention described herein will make themselves apparent to those skilled in the art based on the above. All such variations, alterations and modifications are intended to fall within the spirit and scope of the present invention, limited solely by the appended claims.

I claim:

1. A splice holder for holding multiple single and ribbon optical fiber splices comprising a base member, at least two opposed rows of a plurality of retention members extending upwardly from said base member, said retention members each having a sidewall with at least one lateral opening extending inwardly into said sidewall for accepting at least a portion of a single fiber splice, and a plurality of lateral members in an area between the rows of opposed retention members for accepting at least a portion of a fiber ribbon splice, wherein adjacent retention members are separated by a space for a fiber ribbon entering and exiting the fiber ribbon splice to pass when a fiber ribbon splice is engaged by the lateral members.

2. The splice holder of claim 1 wherein the lateral openings have a width of about 0.12 inches.

3. The splice holder of claim 2 wherein the lateral openings are defined by a wall extending greater than 180° about a perimeter of the opening.

4. The splice holder of claim 1 wherein the lateral openings are stacked vertically on opposed sides of at least one of the retention members.

5. The splice holder of claim 1 wherein the opposed rows of retention members are spaced apart so that the distance between the farthest portions thereof is less than about 2.35 inches.

6. The splice holder of claim 1 wherein the opposed rows of retention members are spaced apart so that the distance between the closest portions thereof is greater than or equal to about 1.6 inches.

7. The splice holder of claim 1 wherein the lateral members extend from the opposed retention members to form opposed lateral members.

8. The splice holder of claim 7 wherein the distance between opposed lateral members is less than 1.6 inches.

9. The splice holder of claim 8 wherein the lateral members on adjacent retention members are separated by a distance of about 0.2 inches at their farthest point.

10. The splice holder of claim 1 further comprising tabs on the base member for sliding engagement with cooperating engagement means on a splice tray to secure the splice holder to the splice tray.

11. The splice holder of claim 1 wherein the splice holder is formed of unitary construction.

12. The splice holder of claim 11 wherein the splice holder is made of a flexible material.

13. The splice holder of claim 12 wherein the flexible material is taken from the group consisting of rubber or PVC.

14. The splice holder of claim 13 wherein the flexible material is PVC.

15. The splice holder of claim 1 wherein lateral members on adjacent retention members are closer together in the area farther from the base member to securely engage the ribbon fiber splice.

* * * * *